(12) United States Patent
Gardner et al.

(10) Patent No.: US 8,141,153 B1
(45) Date of Patent: Mar. 20, 2012

(54) METHOD AND APPARATUS FOR DETECTING EXECUTABLE SOFTWARE IN AN ALTERNATE DATA STREAM

(75) Inventors: Patrick A. Gardner, Northridge, CA (US); Spencer D. Smith, El Segundo, CA (US); Alexander Danileiko, Valencia, CA (US)

(73) Assignee: Symantec Corporation, Mountain View, CA (US)

( * ) Notice: Subject to any disclaimer, the term of this patent is extended or adjusted under 35 U.S.C. 154(b) by 1030 days.

(21) Appl. No.: 12/054,501

(22) Filed: Mar. 25, 2008

(51) Int. Cl.
*G06F 11/00* (2006.01)

(52) U.S. Cl. ............................ 726/22; 726/23; 726/24

(58) Field of Classification Search .............. 726/22–26; 713/187–188
See application file for complete search history.

(56) References Cited

U.S. PATENT DOCUMENTS

| 7,673,324 B2 * | 3/2010 | Tirosh et al. ............... 726/1 |
| 2006/0230452 A1 * | 10/2006 | Field ........................... 726/22 |

\* cited by examiner

*Primary Examiner* — Hosuk Song

(74) *Attorney, Agent, or Firm* — Wilmer Cutler Pickering Hale and Dorr LLP

(57) ABSTRACT

A method and apparatus of detecting executable software in alternate data streams to secure operation of a computer comprises processing information regarding a file requested for execution and determining an alternate data stream associated with the file, wherein the alternate data stream comprises executable software.

18 Claims, 3 Drawing Sheets

METHOD AND APPARATUS FOR DETECTING EXECUTABLE SOFTWARE IN AN ALTERNATE DATA STREAM

BACKGROUND OF THE INVENTION

1. Field of the Invention

Embodiments of the present invention generally relate to computer system security and, more particularly, to a method and apparatus for detecting executable software in an alternate data stream.

2. Description of the Related Art

Today, a computer has become a basic necessity, and is used in many organizations, such as government agencies and businesses, for communication, research, productivity and the like. As the usage of the computer increases, threats to the stability and performance of the computer also increases and hackers and malware being amongst the predominant threats.

Hackers aim to disrupt the operations of and exert control over a computer. A hacker may use malware (i.e., malicious software code) to achieve such aim, for example, with an intention of stealing confidential data, corrupting data or the computer system, among others. In certain cases, malware is transmitted to the computer by the hacker, and as the malware is executed the programs, or data, or the computer may be damaged. As a result, the computer ceases to operate properly and users experience a loss in productivity.

Hackers exploit various weaknesses to invade and control the computer. For example, the fact that alternate data streams are not displayed on browsing utilities is exploited to surreptitiously invade and control computers. Although the use of alternate data streams augment the functionality of the file system; unfortunately, hackers hide rootkits and malware in the alternate data streams to avoid detection. For example, hackers can couple a 5 megabyte (MB) malware as an alternate data stream to a 10 kilobyte (KB) executable file. When a user tries to view the directory, only the 10 KB executable file is visible and the alternate data stream comprising the 5 MB malware is not displayed. As such, the user is not aware that malware has infected the computer.

This is due to the fact that the MICROSOFT WINDOWS operating system has the ability to fork file data into existing files (alternate data streams) without affecting their functionality, size or display to traditional file browsing utilities like the DOS command DIR or Windows Explorer. Generally, the alternate data streams are used by variety of computer programs, including the native MICROSOFT WINDOWS operating system, to store file system information such as file or directory attributes and metadata (e.g., non-resident attribute information). Such computer programs may read data from and write data to the alternate data streams. Some file systems, such as NTFS, implement both primary and alternate data streams. All data for a file is stored on the primary data stream, but by using the syntax 'file:stream', an alternate data stream is coupled to the file. Consequently, when computer programs read or execute data from the file, the computer programs also read or execute the contents of the alternate data stream. Additionally, a computer running the New Technology File System (NTFS) may use alternate data streams to be compatible with the APPLE MAC operating system and MAC file systems.

Based on data submitted to the security subscription service, only malicious programs use alternate data streams to execute content (e.g., another malicious program). Hence, if any application requests that the executable file be accessed and run (e.g., using a file "open for execute" request), the malware is executed from the alternate data stream. As a result of execution of the malware, the computer will cease to operate properly and the user may experience a loss in productivity, a loss in data or any other form of damage to the computer system.

According to one of the prevalent methods, alternative data stream-based malware is detected using signatures (e.g., a piece of the malicious code that indicates a particular group of malware). Such a method relies upon data submitted by subscribers to a security service to develop such signatures. Hence, such a method creates signatures only after the hacker has already used alternate data stream-based malware to attack the computer. As a result, current signature-based malware detection technology is limited to detecting malware for which signatures have already been created and do not detect malware that do not have signatures. Further, signature based malware detection is increasingly becoming difficult and costly, because hackers adapt the malicious code very quickly in response to the latest signatures.

Accordingly, there is a need in the art for a method and apparatus for detecting executable software in the alternate data stream before execution where malware is an example of executable software.

SUMMARY

Embodiments of the present invention comprise a method and an apparatus for detecting malware to secure operation of a computer. In one embodiment, a method of detecting malware to secure operation of a computer comprises processing information regarding a file requested for execution and determining an alternate data stream associated with the file, wherein the alternate data stream comprises executable software.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
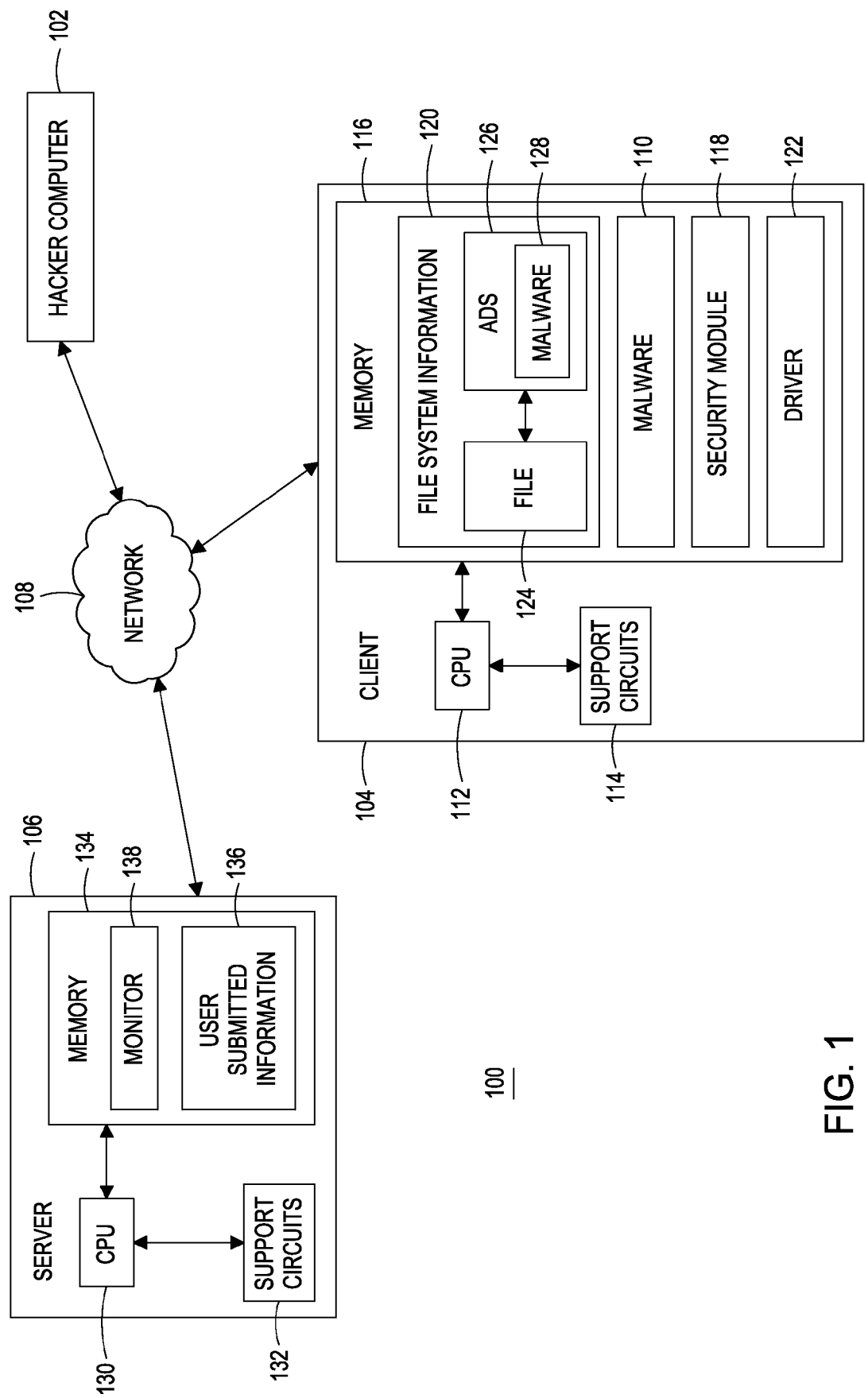
FIG. 1 is a block diagram of a system for detecting executable software in an alternate data stream according to one or more embodiments of the present invention.

FIG. 1 is a block diagram of a system 100 for detecting executable software such as malware that uses an alternate data stream to hide in computer memory. The system 100 comprises a hacker computer 102, a client 104, and a server 106, each coupled to each other through a network 108.

The hacker computer 102 is a computing device that is used to attack other computer systems, such as the client 104. The hacker computer 102 desires to exert control over the client 104 with an intention to damage or interfere with the operation of the client 104 using email and web based threats. For example, the hacker computer 102 may attack the client 104 through an email attachment. A virus, Trojan or malware may be launched when the email is opened by a user of the client 104. As another example, the hacker 102 may be a compromised web site that attacks the client 104 when the user browses the hacker computer 102. If successful, the client 104 ceases to operate properly. In one embodiment, the hacker computer 102 creates and transmits a malware 110 to the client 104. The malware 110 is any software package that comprises malicious code designed to degrade the performance of the client 104 and allow the hacker computer 102 to exert control over the client 104.

The client 104 is any type of computing device (e.g., laptop, desktop, Personal Desk Assistant (PDA), mobile phone and the like), such as those generally known in the art. The client 104 includes a central processing unit (CPU) 112, various support circuits 114, and a memory 116. The CPU 112 may comprise one or more commercially available microprocessors or microcontrollers that facilitate data processing and storage. The support circuits 114 facilitate the operation of the CPU 112 and comprise at least one of clock circuits, power supplies, cache, input/output circuits, and the like. The memory 116 comprises at least one of read only memory (ROM), random access memory (RAM), disk drive storage, optical storage, removable storage, and the like. The memory 116 includes various software packages, such as a security module 118, a driver 122. The memory 114 further includes various data, such as file system information 120.

The server 106 includes a central processing unit (CPU) 130, various support circuits 132, and a memory 134. The CPU 130 may comprise one or more commercially available microprocessors or microcontrollers that facilitate data processing and storage. The support circuits 132 facilitate the operation of the CPU 130 and comprise at least one of clock circuits, power supplies, cache, input/output circuits, and the like. The memory 134 comprises at least one of read only memory (ROM), random access memory (RAM), disk drive storage, optical storage, removable storage, and the like. The memory 134 includes various software packages, such as a monitor 138. The memory 134 further includes various data, such user submitted information 136. The user submitted information 136 includes information regarding malware that has been detected on various computers such as the client 104. The user submitted information 136 indicates that if a first program attempts to execute a second program from an alternate data stream, both programs are malicious and should be flagged and/or removed. Generally, alternate data streams are rarely used by non-operating system software.

The network 108 comprises a communication system that connects computers to one another by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like.

The file system information 120 is used by an operating system to manage various resources associated with the client 104. The file system information 120 stores various data pertaining to one or more file systems used by the operating system to organize and retrieve files and directories. The file system information 120 further stores various attributes related to such files and directories (e.g., execution/access rights, filename, owner, modified time, among others). The file system information 120 includes a file 124 and an alternate data stream 126. The file 124 may be requested for execution by various applications (e.g., software packages such as word processing applications, business applications or financial applications and the like). The alternate data stream 126 is also portion of the file system information 120 and coupled to the file 124. The alternate data stream 126 is typically used for storing metadata or/and other attribute information for the file 124 by the operating system of the client 104. The alternate data stream 126 may include executable software, such as a malware 128. The malware 128 is malicious code that is transmitted to the client 104 and hides in the alternate data stream 126 awaiting execution.

By the way of example and not as a limitation, the hacker computer 102 may open a connection (e.g., a socket) on the client 104 through one or more web-based or email-based techniques, which allows the malware 110 to migrate to the client 104 and stores the malware 128 (e.g., mal.exe) in the file system information 120 as the alternate data stream 126. The hacker computer 102 associates the alternate data stream 126 with the file 124 using the malware 128. The file 124 may be an executable file (e.g., file1.exe). For example, in NTFS, the correct syntax of a filename for file1.exe with mal.exe attached as an alternate data stream is "file1.exe:mal.exe." The alternate data stream 126 will fork with the file 124 (e.g., file1.exe) because the operating system considers mal.exe to simply be more data associated with file1.exe. As a result, if file1.exe is opened and executed by the malware 110, then mal.exe or the malware 128 is also executed. Further, the malware 128 remains undetected or hidden from recognition because current browsing utilities do not display the alternate data stream 126 and/or the operating system does not prevent or otherwise restrict the ability to open and execute a program from the alternate data stream 126.

The driver 122 is a software package that couples applications (e.g., word processing application, financial application, among others which can execute files) with the file system information 120. In one or more embodiments, the driver 122 receives a notification that the file 124 is requested to be "open for execute" by a program (e.g., the malware 110). The driver 122 determines if the file 124 is permitted to be executed (e.g., execute right). In one embodiment, the driver 122 parses the filename associated with the file 124. If the filename includes the syntax for the alternate data stream 126 (e.g., file1.exe:mal.exe), then there is a strong likelihood that the program requesting the execution of the file 124 is malicious. Furthermore, any program being executed from the alternate data stream is also malicious. Accordingly, the malware 110 is attempting to execute the malware 128 from the alternate data stream 126. In one or more embodiments, the driver 122 identifies both the first malware 110 and the second malware 128 as malicious because no legitimate program should be executing another program from the alternate data stream 126, unless both programs are malware.

In another embodiment, the driver 122 monitors one or more events (e.g., process or section creation events, Application Programming Interface (API) calls and the like) associated with the file system information 120 and the operating system of the client 104. In general, a section creation event occurs when a file is mapped into the memory 116 and a process is created after it is opened for execution. In operation, the malware 110 requests that the operating system open the file 124 for execution in order to execute the malware 128 from the alternate data stream 128. At this point, a process is being created for the file 124 and the alternate data stream 126. In one embodiment, the driver 122 parses the filename for the file 124 to determine whether the filename comprises the syntax for alternate data streams. If the driver 122 identifies the alternate data stream 126 (e.g., a process created for the alternate data stream 126), then the driver 122 prevents the execution and/or removes the malware 110 and the malware 128 from the client 104. Alternatively, the malware 110 may use the API function CreateProcess( ) to execute the malware 128 from the alternate data stream 126. In this alternate embodiment, the driver 122 intercepts the CreateProcess( ) function call for the file 124 and determines that a process is being created for the alternate data stream 126. For example, the driver 122 examines the filename for the file 124 to determine if the filename comprises the syntax for alternate data streams.

The security module 118 may be a security application that forms a portion of a security subscription service for securing the client 104 (e.g., SYMANTEC NORTON products). The security module 118 may perform various functions, once the driver 122 has identified the first malware 110 and the second malware 128. In one or more embodiments, the security module 118 may terminate and remove the first malware 110 and the second malware 128 from the client 104. In another embodiment, the security module 118 may communicate information regarding the first malware 110 and the second malware 128 to the server 106.

In one or more embodiments, the monitor 138 processes information regarding the first malware 110 and/or the second malware 128. The information is communicated by the security module 118 via network 108 for further evaluation. In one or more embodiments, the information processed by the monitor 138 is stored as the user submitted information 136.

Figure 2:
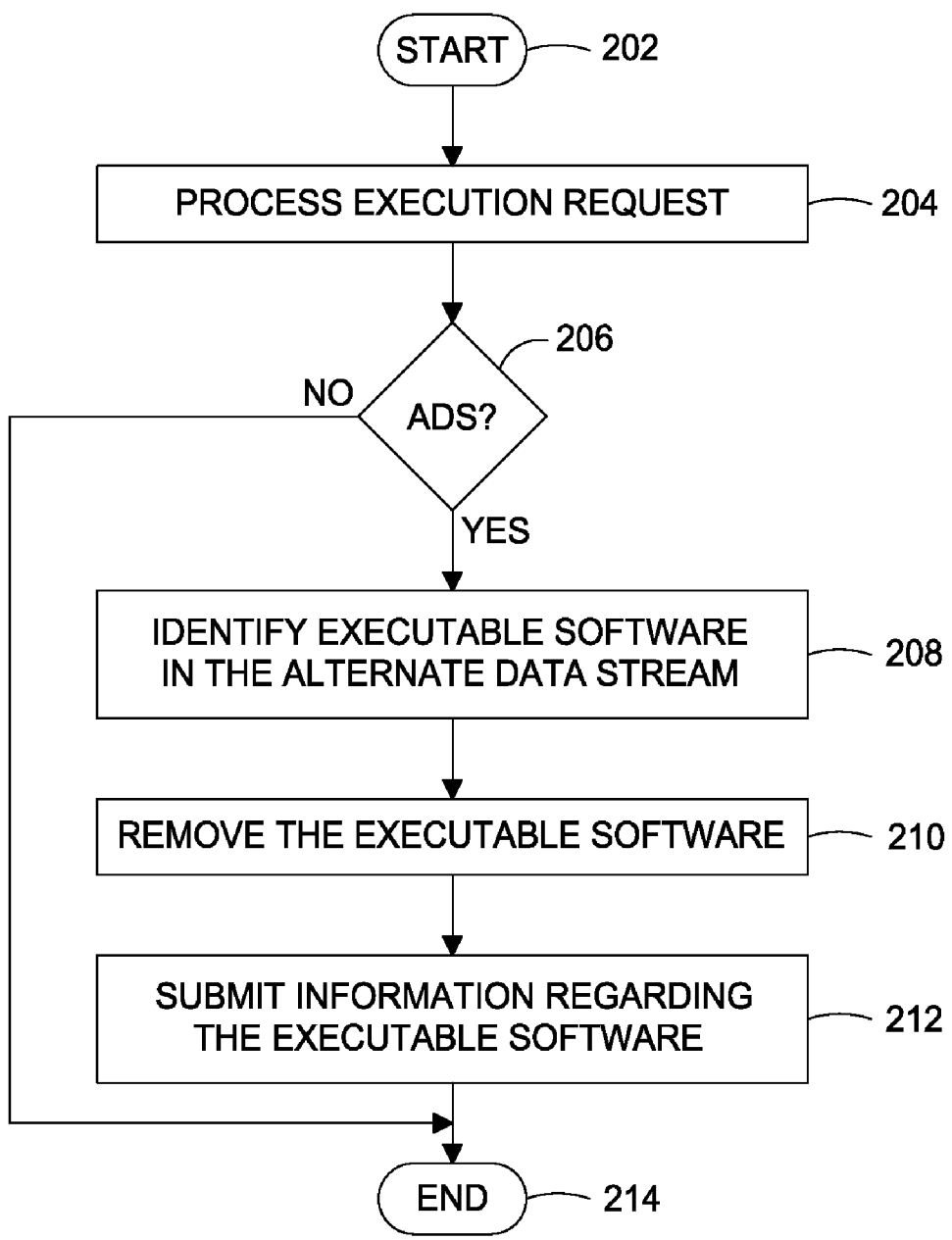
FIG. 2 is a flow diagram of a method of identifying executable software in an alternate data stream according to one or more embodiments of the present invention.

FIG. 2 illustrates a method 200 of identifying executable software such as malware in an alternate data stream, in accordance with one or more embodiments of the invention. The method has been explained with reference to the system 100 of FIG. 1.

The method 200 starts at step 202 and proceeds to step 204, at which a driver (e.g., the driver 122 of FIG. 1) processes a request for execution of a file (e.g., the file 124 of FIG. 1). At step 206, a determination is made as to whether an alternate data stream (e.g., the alternate data stream 126 of FIG. 1) is coupled to the file. If it is determined that the file is coupled to the alternate data stream (option "YES") then the method 200 proceeds to step 208. If, at step 206 it is determined that the file is not coupled to the alternate data stream (option "NO"), then the method 200 proceeds to step 214. The step 206 is discussed further with respect to FIG. 3.

At step 208, the driver identifies executable software in the alternate data stream (e.g., the malware 110 and the malware 128 of FIG. 1). At step 210, the executable software is removed by a security module (e.g., the security module 118 of FIG. 1). At step 212, information regarding the executable software is submitted to a monitor (e.g., the monitor 138 of FIG. 1) on a server (e.g., the server 106 of FIG. 1) for further evaluation. The method 200 ends at step 214.

Figure 3:
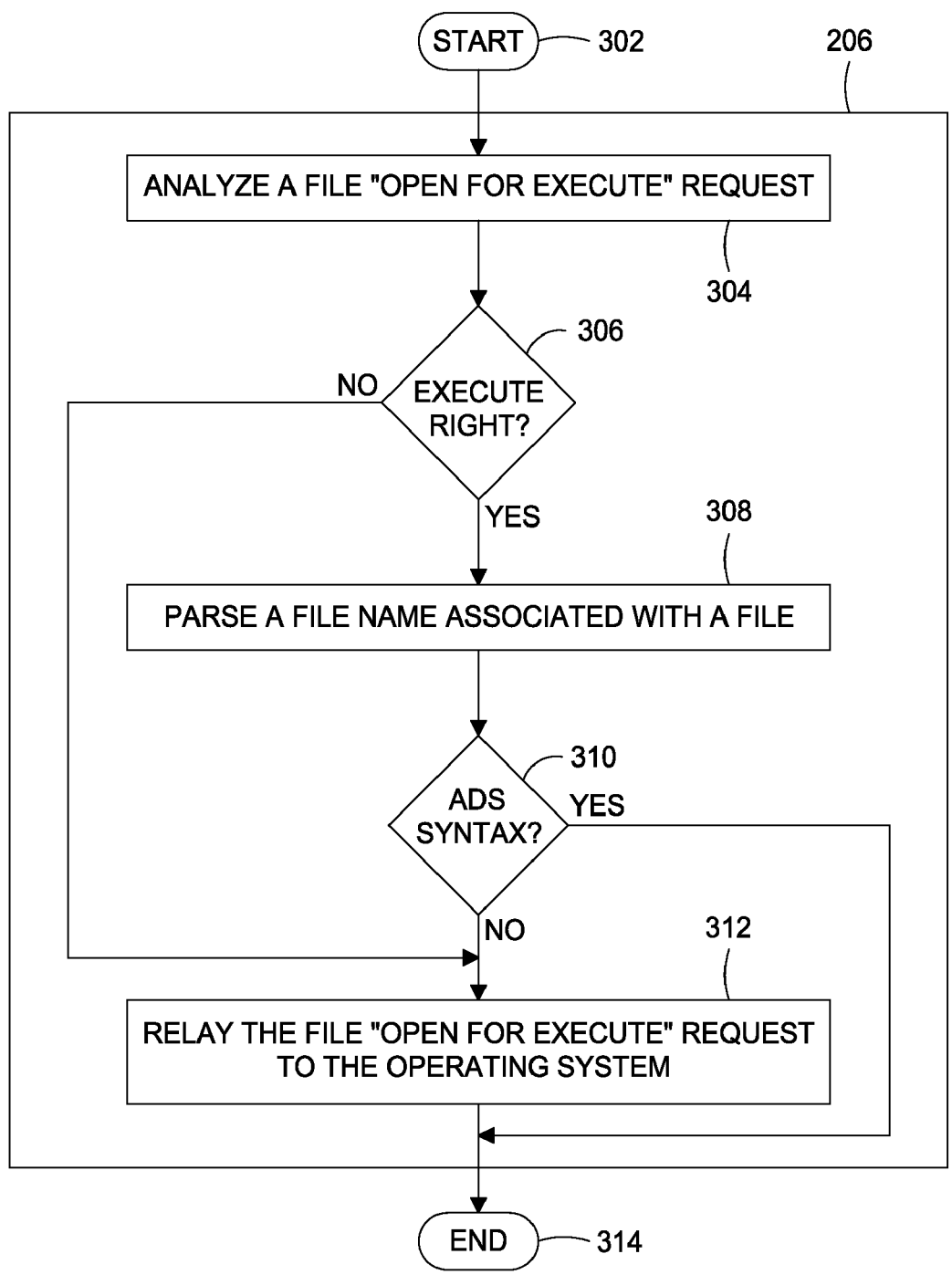
FIG. 3 is a flow diagram of a method of determining an alternate data stream from a file "open for execute" request according to one or more embodiments of the present invention.

FIG. 3 illustrates a method 300 of determining an alternate data stream from a file "open for execute" request. The method 300 is an embodiment of the step 206 of the method 200 as explained above. The method 300 starts at step 302 and proceeds to step 304.

At step 304, the file "open for execute" request is analyzed. At step 306, a determination is made as to whether the file has an execute right. If the file is determined to have an execute right (option "YES"), then the method 300 proceeds to step 308. If, at step 306, it is determined that the file does not have execute rights (option "NO"), then the method 300 proceeds to step 312.

At step 308, a filename associated with the file is parsed. At step 310, a determination is made as to whether the filename includes the syntax for the alternate data stream. If it is determined that the filename has the syntax for the alternate data stream (option "YES"), then the method 300 proceeds to the step 314. In one embodiment, a driver determines that the filename includes for the file includes a colon and the alternate data stream following the file.

If, at step 310, it is determined that the filename does not include the syntax for the alternate data stream (option "NO"), then the method 300 proceeds to the step 312. At step 312, the file "open for execute" request is relayed to the operating system. The operating system opens the file for execute. The method 300 ends at step 314.

While the foregoing is directed to embodiments of the present invention, other and further embodiments of the invention may be devised without departing from the basic scope thereof, and the scope thereof is determined by the claims that follow.

What is claimed is:

1. A method of detecting executable software in alternate data streams to secure operation of a computer, comprising:
   processing, via at least one computer processor, information regarding a file requested for execution;
   determining an alternate data stream associated with the file by analyzing a file open for execute request for the file, wherein the alternate data stream comprises executable software; and
   blocking the file open for execute request to prevent execution of the file.

2. The method of claim 1 further comprising identifying a first malware and a second malware, wherein the first malware requested the execution of the file to execute the second malware from the alternate data stream.

3. The method of claim 2, wherein the first malware couples the alternate data stream with the file.

4. The method of claim 2 further comprising terminating the first malware and the second malware.

5. The method of claim 2 further comprising removing the first malware and the second malware from a computer.

6. The method of claim 2 further comprising communicating information regarding at least one of the first malware or the second malware.

7. The method of claim 1, wherein determining the alternate data stream further comprises analyzing a filename of the file to identify a syntax for the alternate data stream in the filename.

8. The method of claim 1, wherein analyzing the file open for execute request further comprising:
   determining an execution right for the file;
   parsing a filename that corresponds to the file open for execute request; and
   identifying the alternate data stream based on the parsed filename.

9. The method of claim 8, wherein a first malware initiated the file open for execute request to execute a second malware from the alternate data stream.

10. The method of claim 1, wherein determining the alternate data stream further comprises monitoring a plurality of section creation events to identify a section creation event related to the file and the alternate data stream.

11. The method of claim 1, wherein determining the alternate data stream further comprises examining an Application Programming Interface function call to identify the alternate data stream coupled to the file.

12. An apparatus for detecting executable software in alternate data streams to secure operation of a computer, comprising:
- at least one computer processor configured to:
  - examine information regarding a file requested for execution to identify an alternative data stream associated with the file that comprises executable software, wherein the alternate data stream associated with the file is identified by analyzing a file open for execute request for the file; and
  - interrupt execution of the executable software by blocking the file open for execute request to prevent execution of the file.

13. The apparatus of claim 12, wherein a first malware requested the file to be executed to execute the executable software from the alternate data stream, wherein the executable software is a second malware.

14. The apparatus of claim 12, wherein the at least one computer processor is further configured to process a notification of file open for execute request for the file and analyze a filename associated with the file to determine the alternate data stream.

15. The apparatus of claim 12, wherein the at least one computer processor is further configured to parse a filename of the file and determine a syntax associated with the alternate data stream in the parsed filename.

16. A system for detecting executable software in alternate data streams to secure operation of a computer, comprising:
- a client computer, comprising:
  - a driver for examining a filename of a file to identify an alternative data stream coupled with the file and determining a presence of executable software in the alternate data stream, wherein the alternate data stream coupled with the file is identified by analyzing a file open for execute request for the file; and
  - a security module for blocking the file open for execute request to prevent execution of the file; and
- a server computer, comprising:
  - a monitor for processing information regarding the executable software.

17. The system of claim 16, wherein the driver identifies a first malware and a second malware, wherein the first malware requested the file to be executed to execute the second malware from the alternate data stream.

18. The system of claim 16, wherein the security module prevents execution of the first malware and the second malware.

* * * * *